United States Patent [19]

Mehta et al.

[11] Patent Number: 4,847,398

[45] Date of Patent: Jul. 11, 1989

[54] PROCESS FOR THE PREPARATION OF SILOXANE-OXYALKYLENE COPOLYMERS

[75] Inventors: Kunj R. Mehta, Parkersburg; Richard A. Lehew, Sistersville, both of W. Va.; James D. Reedy; David D. Farris, both of Marietta, Ohio; Paul E. Austin, Williamstown, W. Va.

[73] Assignee: Union Carbide Corporation, Danbury, Conn.

[21] Appl. No.: 94,720

[22] Filed: Sep. 9, 1987

[51] Int. Cl.$^4$ ................................................ C07F 7/08
[52] U.S. Cl. .................................. 556/445; 556/437; 556/444
[58] Field of Search ..................... 556/444, 445, 437

[56] References Cited

U.S. PATENT DOCUMENTS

| | | | |
|---|---|---|---|
| 3,280,160 | 10/1966 | Bailey | 556/445 U X |
| 4,025,456 | 5/1977 | Litteral et al. | 556/445 U X |
| 4,059,606 | 11/1977 | Walsingham | 556/445 X |
| 4,160,775 | 7/1979 | Schilling | 556/445 X |
| 4,431,789 | 2/1984 | Okazaki et al. | 556/445 X |
| 4,520,160 | 5/1985 | Brown | 556/445 X |

*Primary Examiner*—Paul F. Shaver
*Attorney, Agent, or Firm*—Paul L. Leuzzi

[57] ABSTRACT

An improved process is provided for the preparation of siloxane-oxyalkylene copolymers by a solventless process via hydrosilation of oxyethylene-rich polyethers in the presence of carboxylic acids or carboxylic acid salts as a catalyst modifier. The use of a carboxylic acid or salt prevents acetal formation through the hydroxyl groups of the polyether and/or copolymer. The use of solvent, acetal treatment and solvent stripping steps of the conventional processes are eliminated and accordingly, environmental as well as economic benefits are achieved.

13 Claims, No Drawings

PROCESS FOR THE PREPARATION OF SILOXANE-OXYALKYLENE COPOLYMERS

FIELD OF THE INVENTION

This invention relates in general to an improved process for the preparation of siloxane-oxyalkylene copolymers. In one aspect, this invention is directed to a process for the preparation of siloxane-oxyalkylene copolymers from uncapped, oxyethylene-rich polyethers using little or no solvent. In a further aspect, the invention is directed to siloxane-oxyalkylene copolymers that are suitable for use as surfactants in urethane foam applications.

BACKGROUND OF THE INVENTION

The preparation of siloxane-oxyalkylene copolymers by the hydrosilation reaction of an organohydrogensiloxane and an olefinically substituted polyoxyalkylene is well known and reported in the literature. The hydrosilation reaction is typically performed in a low molecular weight volatile hydrocarbon solvent such as benzene, toluene, xylene or isopropanol so as to aid in handling the reactants, to moderate an exothermic reaction or to promote the solubility of the reactants.

Prior to the present invention there were few literature references to a solventless process for the preparation of siloxane-oxyalkylene copolymers. For example, in U.S. Pat. No. 4,025,456, it was indicated that the hydrosilation reaction between the organohydrogenpolysiloxane reactant and the olefinically substituted polyoxyalkylene reactant may be conducted without a solvent or conducted in an oxygen containing solvent such as an ether, a polyether, or a lower or higher molecular weight alcohol. This reference, however, utilized alkoxy endblocked polyethers in the hydrosilation reaction and did not disclose the use of uncapped oxyalkylene polyethers.

In most cases, however, the prior art discloses the use of one or more solvents. Thus, for examples, U.S. Pat. No. 4,520,160 teaches the use of high molecular weight, 8-carbon fatty alcohols for the preparation of siloxaneoxyalkylene copolymers. The patent indicates that isopropanol is used as a solvent and must be removed from the product while the fatty alcohol constitutes a part of the product.

Other references, such as, U.S. Pat. Nos. 3,280,160 and 3,401,192 disclose the preparation of copolymers in n-butylether and in a 50/50 mixture of isopropyl alcohol/toluene, respectively. Also in U.S. Pat. No. 4,122,029 the use of isopropyl alcohol is disclosed and in U.S. Pat. No. 3,518,288 the patentee teaches the use of n-propanol/toluene as a suitable solvent for the preparation of siloxaneoxyalkylene copolymers.

In the majority of the aforementioned processes, the hydrocarbon solvent is removed after the hydrosilation reaction is completed, since in most cases, the solvent is too flammable, toxic or otherwise detrimental to the final product or further processing steps in which the copolymer is utilized. Thus, in the processes disclosed in most of the above patents a solvent was employed which required removal from the reaction product after completion of the hydrosilation.

A few instances have been reported in the literature where for one reason or another it was not necessary nor desirable to separate the copolymer from the reaction medium. For example, U.S. Pat. No. 4,520,160 disclosed the use of saturated higher alcohols as a reaction solvent which purposely need not be removed from the resulting copolymer when it is used subsequently in personal care compositions as emulsifiers.

In many instances, however, the solvent does not enter into any further reactions but remains in the final product as is, and hence, there is no need for its removal if it does not adversely affect the product. Thus, in some products, such as personal care products it may even be benefical to have some of the solvent present in the final product.

However, if the copolymer is to undergo further reactions before preparation of the final product is complete, the presence of the solvent might adversely affect such reactions and hence its removal after the hydrosilation step is desired. For example, if one were to use copolymers containing monohydric higher alcohols in urethane foam applications, these alcohols will enter into the urethane reaction and act as reaction chain terminators in a detrimental fashion since they contain only one hydroxyl group. Also, as previously indicated, such solvents may be toxic or otherwise undesirable in further processing of the copolymer. Accordingly, any process which could effect the hydrosiliation reaction in the absence of a solvent would be highly desirable not only from the economic viewpoint in the savings obtained by avoiding a solvent removal step, but also for environmental considerations.

Thus, prior to the present invention, no mention was made in the literature to a solventless process for the preparation of siloxane-oxyalkylene copolymers from uncapped polyethers. The majority of the known processes, as indicated above, utilize a solvent.

Additionally, there are few references in the literature to the use of acid or acid salts in the hydrosilation reaction. U.S. Pat. No. 4,431,789 which is assigned to Shin-Etsu Chemical Co., describes the use of potassium acetate salt with very high (>50%) solvent (isopropanol) levels for the preparation of organopolysiloxanes having alcoholic hydroxy groups. Finally, U.S. Pat. No. 4,515,979 discloses the addition of phytic acid to the polyether but the use of the acid is for the prevention of odors in polyorganosiloxanes.

It is therefore an object of the present invention to provide an improved process for the preparation of siloxane-oxyalkylene copolymers. Another object of this invention is to provide a process for the preparation of siloxane-oxyalkylene copolymers which are useful in the formulation of urethane foams and wherein the hydrosilation reaction is conducted using little or no solvent. A further object of the present invention is to provide a novel process for preparing siloxane-oxyalkylene copolymers from uncapped, generally oxyethylene-rich polyethers, in the absence of solvent. A further object of the invention is to provide a process which utilized a carboxylic acid or a carboxylic acid salt as a catalyst modifier to be added to the reaction mixture for the hydrosiliation reaction. A still further object is to provide a process wherein the use of the acid or salt prevents gelation and also prevents acetal formation through stabilization of propenyl groups. Another object is to provide a process having improved batch production rates of a factor of three or four by eliminating the solvent-stripping and acetal cleavage steps. Another object of this invention is to provide a process which provides improvement in product safety and reduction in solvent emission. A further object of the invention is to provide a process for the preparation of urethane foams which have improved flow properties and other desirable features. These and other objects will readily become apparent to those skilled in the art in the light of the teachings herein set forth.

SUMMARY OF THE INVENTION

In its broad aspect, the present invention is directed to an improved process for the preparation of siloxane-oxyalkylene copolymers, their use as surfactants in the preparation of urethane foams, and the resulting foams obtained therefrom.

These copolymers are prepared by a solventless hydrosilation reaction between an organohydrogenpolysiloxane and an uncapped olefinically substituted polyoxyalkylene, in the presence of a carboxylic acid or a carboxylic acid salt. The carboxylic acid or salt not only aids in the preparation of the copolymer, but when left in the copolymer, aids in the subsequent handling of, and serves as a necessary component of a composition containing the siloxaneoxyalkylene copolymer.

The process of the present invention comprises the steps of:
(1) forming a mixture in the absence of a solvent of:
 (a) an organohydrogensiloxane having the average formula:

$$R_aH_bSiO_{(4-a-b)/2}$$

(b) a polyoxyalkylene having the average formula:

$$R^1(OCH_2CH_2)_z(OCH_2\overset{\underset{\displaystyle CH_3}{|}}{CH})_w-OR^2$$

wherein R, $R^1$, $R^2$, a,b,w and z are as hereinafter indicated,
 (c) a carboxylic acid or carboxylic acid salt reaction promoter,
(2) adjusting and maintaining the temperature of the mixture to promote the reaction of the organohydrogensiloxane with the polyoxyalkylene;
(3) adding to the mixture a catalytic amount of a noble metal hydrosilation catalyst,
(4) allowing the reaction to go to completion, and
(5) recovering the copolymer.

DETAILED DESCRIPTION OF THE INVENTION

As indicated above, the preparation of siloxane-oxyalkylene copolymers by way of a hydrosilation reaction between an organohydrogensiloxane and an olefinically substituted polyoxyalkylene is well known. For various reasons, such as to aid in the handling of the reactants, to moderate an exothermic reaction or to promote solubility of the reactants, the hydrosiliation reaction is typically performed in a low molecular weight volatile hydrocarbon solvent such as benzene, toluene, xylene isopropanol, or mixtures thereof. In these cases the hydrocarbon solvent is usually removed from the newly formed siloxane-oxyalkylene copolymer. This extra processing step is apparently done because the solvent is too flammable, toxic or otherwise detrimental in subsequent urethane foam applications.

Silicone surfactants for rigid polyurethane and isocyanurate foams are generally prepared from polar oxyethylene-rich polyethers containing >60 weight percent ethylene oxide, and which are frequently uncapped. Copolymers prepared from such reactants tend to crosslink through acetal and transacetalization reactions. The acetals can result when allyl polyethers isomerize to propenyl isomers which can react with a hydroxyl compound to form acetals. To eliminate or minimize these reactions the process is carried out in a solvent and frequently includes an acid-catalyzed acetal cleavage step followed by neutralization of acid and solvent-stripping steps. The literature discloses the use of low molecular weight alcohols such as isopropanol to minimize crosslinking through the acetal groups. When only copolymers form acetals, gels result but presumably when low molecular weight alcohols such as isopropanol form acetals there is only a slight change in the viscosity of the silicone copolymer.

As used throughout the specification and appended claims, the term "solventless" or "essentially solventless" means that no added volatile solvent, i.e., a solvent having a boiling point less than 200° C., is employed in the hydrosilation reaction of the organohydrogenpolysiloxane reactant and the polyoxyalkylene reactant. Any small amount of other liquid which might be introduced into the system with, for example, the acid or acid salt or catalyst, is not considered to be a reaction solvent.

The organohydrogensiloxane compounds employed in the present invention for the preparation of the surfactants are those represented by the formula:

$$R_aH_bSiO_{(4-a-b)/2}$$

wherein R denotes a monovalent hydrocarbon radical free of aliphatic unsaturation, a has a value of from 1 to 2.99, b has a value of from 0.001 to 1 and the sum of a+b has a value of from 1.5 to 3.0. The organohydrogenpolysiloxane can contain any combination of siloxane units selected from the group consisting of $R_3SiO_{\frac{1}{2}}$, $R_2HSiO_{\frac{1}{2}}$, $R_2SiO_{2/2}$, $RHSiO_{2/2}$, $RSiO_{3/2}$, $HSiO_{3/2}$ and $SiO_{4/2}$ provided, of course, that the organohydrogenpolysiloxane contains sufficient R-containing siloxane units to provide from about 1 to about 3.0 R radicals per silicon atom and sufficient H-containing siloxane units to provide from 0.01 to 1 silicon-bonded hydrogen atoms per silicon and a total of R radicals and silicon-bonded hydrogen atoms of from 1.5 to 3.0 per silicon. The R-R3 groups represent hydrocarbon radicals.

Illustrative of suitable R radicals are alkyl radicals such as methyl, ethyl, propyl, butyl, decyl and cycloaliphatic radicals such as cyclohexyl and cyclooctyl, aryl radicals such as phenyl, tolyl, and xylyl. R typically is the methyl radical. The olefinically substituted polyoxyalkylene reactant which can be employed in the process of this invention has the formula:

$$R^1(OCH_2CH_2)_z(OCH_2\overset{\underset{\displaystyle CH_3}{|}}{CH})_w-OR^2$$

wherein $R^1$ denotes an alkylene group containing from 3 to 10 carbon atoms; $R^2$ is primarily hydrogen but in less than 75 percent of the molecules $R^2$ may contain an alkyl group containing one to five carbon atoms, an acyl group containing 2 to 5 carbon atoms or a trialkylsilyl group. Z has a value of 0 to 50 and w has a value of 0 to 50. The olefinically substituted polyoxyalkylene may be a blocked or randomly distributed polymer.

Thus, by the term "uncapped" as used throughout the specification and claims is meant those polyoxyalkylene compounds of the above formula wherein $R^2$ is hydrogen, or $R^2$ may represent the indicated alkyl, acyl, aralkyl or trialkylsilyl group but only when present in less than 75 percent of the polyoxyalkylene molecules present in the reaction mixture.

The hydrosilation reaction, as previously noted, can be optionally conducted in the presence of salts of carboxylic acids as promoters, and which can be present for the hydrosilation of polyethers with organohydrogen-polysiloxanes. A low level of carboxylic acid salts may already be present in some olefinically substituted polyoxyalkylenes due to inadvertant exposure to traces of oxygen during partial capping of hydroxyl groups with allylic, methyl or acyl groups. However, since the polyethers are "uncapped" it has been noted that the polyoxyalkylene reactant is essentially free of oxidation by-products, and hence the use of a promoter is necessary if an efficient and rapid reaction of the oganohydrogenpolysiloxane and polyoxalkylene reactant is to occur.

These promoters can be represented by the formula:

$$RCO_2M$$

wherein M is H, alkali or alkaline earth metals or alternately ammonium or phosphonium salts and R represents a monovalent hydrocarbon group of from 2 to 20 carbon atoms. The preferred carboxylic acids contain 3 or more carbon atoms and are composed of carbon, hydrogen and oxygen. Particularly preferred are the monocarboxylic acids containing from about 3 to about 20 carbon atoms. Due to traces of carboxylic acid impurities in the polyoxyalkylenes it is sometimes only necessary to add some source of M as an amine or weak base such as sodium bicarbonate to achieve the desired effect. The promoter level needs to be at least about 200 ppm and typically at about 0.1 weight percent of reactants. Concentrations of from about 200 ppm to about 10,000 ppm can also be employed and the actual amount will be dependent to some degree on the particular acid salt employed.

As previously indicated, the hydrosilation reaction is conducted in the presence of a noble metal hydrosilation catalyst. Thus, the hydrosilation reaction between the organohydrogenpolysiloxane and an olefinically substituted polyoxyalkylene reactant is facilitated by using a catalytic amount of a noble metal-containing catalyst. Such catalyst are well known and include platinum, palladium and rhodium-containing catalysts. Chloroplatinic acid is particularly preferred.

The catalyst is employed in an catalytic amount sufficient to promote the hydrosilation reaction. In practice the amount of catalyst will usually be within the range of from about 1 to about 100 ppm of noble metal based on the total parts of the mixture of reactants.

In practice, the hydrosilation reaction is conducted in a batch process wherein the reactants are introduced into a reactor and the temperature of the mixture adjusted to within the range of from about 0° to about 180° C., and more preferably from about 20° to about 120° C. Upon addition of the catalyst the reaction is usually exothermic, peaking at a temperature of from about 75° to about 145° C. Thereafter the desired polymer is recovered. If desired, the reaction can be conducted in an inert atmosphere such as nitrogen.

By conducting the hydrosilation reaction in the manner indicated above, and employing the carboxylic acid or carboxylic acid salt, improvements are obtained in one or more aspects of the reaction, such as reaction rate, reaction yield, reaction selectivity, reaction processing, or reaction product processing in urethane foam applications.

The organopolysiloxane surfactants prepared by the process of the present invention are particularly useful and have been found to be excellent and efficient surfactants for the preparation of rigid polyether polyurethane foams. It has been found that the surfactants of this invention provide improved levels of performance to polyurethane foams.

In producing the polyurethane foams using the surfactants of this invention, one or more polyether polyols is employed for reaction with the polyisocyanate reactant to provide the urethane linkage. Such polyols have an average of at least two, and typically 3.0 to 6.0, hydroxyl groups per molecule and include compounds which consist of carbon, hydrogen and oxygen and compounds which may also contain phosphorus, halogen, and/or nitrogen. Such polyether polyols are well known in the art and are commercially available.

The organic polyisocyanates that are useful in producing rigid polyether polyurethane foams in accordance with the process of this invention are also well known in the art and are organic compounds that contain at least two isocyanate groups and any such compounds or mixtures thereof can be employed. The toluene diiisocyanates are among many suitable isocyanates which are commercially used in the preparation of foams.

The urethane-foaming reaction is usually effected in the presence of a minor amount of a catalyst, preferably an amine catalyst and usually a tertiary amine.

It is also preferred to include a minor amount of certain metal catalysts in addition to the amine catalyst in the component of the reaction mixture. Such supplementary catalysts are well known to the art of rigid polyether-based polyurethane foam manufacture. For example, useful metal catalysts include organic derivatives, of tin, particularly tin compounds of carboxylic acids such as stannous octoate, stannous oleate and the like.

Foaming is accomplished by employing a small amount of a polyurethane blowing agent such as a fluorocarbon in the reaction mixture. Since many rigid isocyanurate foams are used in insulation, fluorocarbons are most commonly used as the blowing agents because foams from fluorocarbons are superior to air or carbon dioxide-containing foams. A small amount of water, may also be used to generate polyurea to strengthen the foam. These methods are well known in the art. The polyether-based polyurethane foams of this invention may be formed in accordance with any of the processing techniques known to the art such as, in particular, the "one-shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol, flame retardant and catalyst components.

It is understood that the relative amounts of the various components of the foam formulation are not narrowly critical. The polyether polyol and polyisocyanate are present in the foam-producing formulation in a major amount. The relative amounts of these two components is the amount required to produce the desired urethane structure of the foam and such relative amounts are well known in the art. The blowing agent, catalyst, flame retardant and surfactant are each present in a minor amount necessary to achieve the function of the component. Thus, the blowing agent is present in an amount sufficient to foam the reaction mixture, the catalyst is present in a catalytic amount which is that amount necessary to catalyze the reaction to produce the urethane at a reasonable rate, and the surfactant is an amount sufficient to impart the desired properties.

The polyurethanes produced in accordance with the present invention can be used in the same areas as conventional rigid polyether polyurethanes. For example, the foams of the present invention can be used with advantage in the manufacture of packaging, gaskets, sealers, thermal insulators and the like.

The following examples illustrate the best mode presently contemplated for the practice of this invention.

Examples 1-4 below, demonstrate what happens when attempts are made to prepare the copolymers in a solventless medium and without the catalyst modifiers of the present invention. Example 4 shows the current, conventional mode of preparation using toluene solvent and HCl-catalyzed acetal cleavage. Example 5 and 6 show the use of isopropanol solvent without acetal treatment but which require the use of more than 15% solvent. Examples 7-10 conclusively demonstrate the process of the present invention which employs a carboxylic acid salt as catalyst modifier in the absence of a solvent to effect the hydrosilation reaction and eliminate solvent removal and acetal treatment steps. Examples 11-13 show that the mere addition of neutralizing agents/pH buffers does not work. Example 14 shows the effectiveness of the salts of this invention in preventing acetal formation even with toluene solvent present. Examples 15-20 are variations of Example 8 as applied to other, similar products.

Additionally, the hydrosilation reaction products prepared in the examples were evaluated as surfactants in an L-panel rigid foam test in the following manner:

A mixture of 35.0 parts of polyol, 15.0 parts of flame retardant, 25.0 parts of fluorocarbon and 0.75 part of amine catalyst were added and thoroughly mixed in a stainless steel cup. To this mixture 0.2 part of the copolymer prepared as set forth in the examples was added and mixed for 10 seconds. Thereafter, 55.0 parts of polymeric isocyanate, 110 index, was added and mixed for an additional 8 seconds at 2100 rpm. The above mixture was then poured into an L-panel mold port, kept at 105°-115° F. The mold port cover was replaced and clamped and after 5 minutes the mold was placed in a 212° F. oven for an additional 5 minutes after which the mold was removed and disassembled. The cured foam specimen was then removed from the panel and evaluated.

EXAMPLE 1

To a 4-neck, round bottom flask, equipped with a stirrer, Friedrich condenser, a temperature-controller and a sparge tube the following materials were charged. 150 grams of allyloxypolyethylene glycol APEG (385 mw) of aqueous pH 5.5 adjusted with 85% phosphoric acid addition, 82.1 grams of equilibrated organohydrogenpolysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2-dimethoxyethane and ethanol. Within 3 minutes the reaction exothermed and the flask temperature peaked at 126° C. Within another 8 minutes the flask contents become viscous and gelled.

EXAMPLE 2

The following materials were charged in the sequence indicated below to a 4-neck, round bottom flask, equipped with a stirrer, Friedrich condenser, a temperature-controller and a sparge tube: 150 grams of allyloxypolyethylene glycol APEG (385 mw) of aqueous pH 5.5 adjusted with 85% phosphoric acid addition, 8.4 grams (10% of the total SiH fluid) of equilibrated organohydrogen polysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. The procedure differed from that of Example 1 in that the SiH was added sequentially to APEG with 10% of the SiH fluid already in the reaction flask. The flask contents were agitated and heated to 75° C. reaction temperature with a light nitrogen sparge. Heating and nitrogen sparge were stopped and the reaction was catalyzed with 0.67 cc of 3.3% chloroplatinic acid solution in 1,2-dimethoxyethane and ethanol. After an initial exotherm to 89° C., the remaining 73.7 grams of the SiH fluid were added. The reaction gelled in 7 minutes thereafter.

EXAMPLE 3

In a manner similar to Example 2, the following materials were charged in the sequence indicated below to a 4-neck, round bottom flask, equipped with a stirrer, Friedrich condenser, a temperature-controller and a sparge tube: 15.0 grams (10% of total) of allyloxypolyethylene glycol APEG (385 mw) of aqueous pH 5.5 adjusted with 85% phosphoric acid addition, 82.1 grams of equilibrated organohydrogen polysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. The flask contents were agitated and heated to 75° C. reaction temperature with a light nitrogen sparge. Heating and nitrogen sparge were stopped and the reaction was catalyzed with 0.48 cc of 3.3% chloroplatinic acid solution in 1,2-dimethoxyethane and ethanol. An initial exotherm to 89° C. was observed and thereafter the addition of the remaining 135 grams APEG was resumed. The reaction gelled by the time only 10% of the APEG had been added during the reaction.

EXAMPLE 4

In a manner similar to Example 3 the following materials were charged to a 4-neck, round bottom flask, equipped with a stirrer, Friedrich condenser, a temperature-controller and a sparge tube: 15.0 grams (10% of total) of allyloxypolyethylene glycol APEG (385 mw) of aqueous pH 5.5 adjusted with 85% phosphoric acid addition, 82.1 grams of equilibrated organohydrogen-polysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. In this example 30 weight percent toluene was employed as the reaction solvent. The flask contents were agitated and heated to 75° C. reaction temperature with a light nitrogen sparge. At the 75° C. temperature, heating and nitrogen sparge were stopped and the reaction was catalyzed with 0.68 cc of 3.3% chloroplatinic acid solution in 1,2-dimethoxyethane and ethanol. After an initial exotherm to 85° C. the remaining 135 grams of APEG were added to the flask over a period of 31 minutes. Following completion of the reaction, 1.5% water and 0.25% concentrated HCl were added and held at 80° C. for one hour for the acetal treatment. Following neutralization with dry NaHCO$_3$, toluene was stripped from the product. The filtered product was 416 centistokes in viscosity and it made acceptable foam.

EXAMPLE 5

In a manner similar to example 1 the following materials were charged to a 4-neck, round bottom flask, equipped with a stirrer, Friedrich condenser, a temperature-controller and a sparge tube; 150 grams of allyloxypolyethylene glycol APEG (385 mw) of aqueous pH 5.5 adjusted with 85% phosphoric acid addition, 82.1 grams of equilibrated organohydrogenpolysiloxane (SiH) fluid having nominal MD$_{15}$D'$_6$M structure, where, M=(CH$_3$)$_3$SiO$_{\frac{1}{2}}$, D=(CH$_3$)$_2$SiO and D'=CH$_3$(H)SiO. In this example 30 weight percent isopropanol was employed as the reaction solvent. The flask contents were agitated and heated to 75° C. reaction temperature with a light nitrogen sparge. At the 75° C. temperature, heating and nitrogen sparge were stopped and the reaction was catalyzed with 1.01 cc of 3.3% chloroplatinic acid solution in 1,2-dimethoxyethane and ethanol. The stripped product had a viscosity of 288 centistokes and made an acceptable foam.

EXAMPLE 6

In a manner similar to Example 1 the following materials were charged to a 4-neck, round bottom flask, equipped with a stirrer, Friedrich condenser, a temperature-controller and a sparge tube; 152.6 grams of allyloxypolyethylene glycol APEG (385 mw) of aqueous pH 5.5 adjusted with 85% phosphoric acid addition, 79.4 grams of equilibrated organohydrogenpolysiloxane (SiH) fluid having nominal MD$_{15}$D'$_6$M structure, where, M=(CH$_3$)$_3$SiO$_{\frac{1}{2}}$, D=(CH$_3$)$_2$SiO and D'=CH$_3$(H)SiO. In this example 15 weight percent isopropanol was employed as the reaction solvent. The flask contents were agitated and heated to 75° C. reaction temperature with a light nitrogen sparge. At the 75° C. temperature, heating and nitrogen sparge were stopped and the reaction was catalyzed with 0.56 cc of 3.3% chloroplatinic acid solution in 1,2-dimethoxyethane and ethanol. The stripped product had a viscosity of 681 centistokes and made an acceptable foam.

EXAMPLE 7

The same procedure as in Example 3 was employed except that 0.1% by weight of sodium butyrate was added to the APEG. This involved the addition to the 4-neck, round bottom flask of 15.0 grams (10% of the total) of allyl-oxypolyethylene glycol APEG (385 mw) of aqueous pH 5.5 adjusted with 85% phosphoric acid addition, and 82.1 grams of equilibrated organohydrogenpoly-siloxane (SiH) fluid having nominal MD$_{15}$D'$_6$M structure, where, M=(CH$_3$)$_3$SiO$_{\frac{1}{2}}$, D=(CH$_3$)$_2$SiO and D'=CH$_3$(H)SiO. The flask contents were agitated and heated to 75° C. reaction temperature with a light nitrogen sparge. Heating and nitrogen sparge were stopped and the reaction was catalyzed with 0.67 cc of 3.3% chloroplatinic acid solution in 1,2-dimethoxyethane and ethanol. The remaining 135 grams of APEG were added over a 41 minute period to the SiH fluid/10% APEG mixture in the reaction flask at a rate such as to maintain 75°–85° C. reaction temperature. Fifteen minutes after completing the addition, the SiH content was too low to be detected. No Acetal treatment was required. The product viscosity was 284 centistokes and the filtered product passed the standard rigid foam test.

EXAMPLE 8

In a manner similar to that employed in Example 1, to a 4-neck, round bottom flask, equipped with a stirrer, Friedrich condenser, a temperature-controller and a sparge tube the following materials were charged: 150 grams of allyloxypolyethylene glycol APEG (385 mw) of aqueous pH 5.5 adjusted with 85% phosphoric acid addition and 82.1 grams of equilibrated organohydrogenpolysiloxane (SiH) fluid having nominal MD$_{15}$D'$_6$M structure, where, M=(CH$_3$)$_3$SiO$_{\frac{1}{2}}$, D=(CH$_3$)$_2$SiO and D'=CH$_3$(H)SiO. Additionally, 0.1% of sodium propionate was also added to the mixture. In all examples the acid salt is in % by weight based on the polyether. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2dimethoxyethane and ethanol. This one-pot, batch reaction produced 258 centistokes viscosity and a statisfactory foam which passed a standard rigid foam test.

EXAMPLE 9

In a manner similar to that of Example 1, to a 4-neck, round bottom flask, equipped with a stirrer, Friedrich condenser, a temperature-controller and a sparge tube the following materials were charged: 150 grams of allyloxypolyethylene glycol APEG (385 mw) of aqueous pH 5.5 adjusted with 85% phosphoric acid addition and 82.1 grams of equilibrated organohydrogenpolysiloxane (SiH) fluid having nominal MD$_{15}$D'$_6$M structure, where, M=(CH$_3$)$_3$SiO$_{\frac{1}{2}}$, D=(CH$_3$)$_2$SiO and D'=CH$_3$(H)SiO. Additionally, 0.02% of sodium propionate was also added to the mixture. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2-dimethoxyethane and ethanol. This one-pot, batch reaction produced 257 centistokes viscosity and a statisfactory foam which passed a standard rigid foam test.

EXAMPLE 10

In a manner similar to that of Example 1, to a 4-neck, round bottom flask, equipped with a stirrer, Friedrich condenser, a temperature-controller and a sparge tube the following materials were charged: 150 grams of allyloxypolyethylene glycol APEG (385 mw) of aqueous pH 5.5 adjusted with 85% phosphoric acid addition and 82.1 grams of equilibrated organohydrogenpolysiloxane (SiH) fluid having nominal MD$_{15}$D'$_6$M structure, where, M=(CH$_3$)$_3$SiO$_{\frac{1}{2}}$, D=(CH$_3$)$_2$SiO and D'=CH$_3$(H)SiO. Additionally, 0.5% of sodium propionate was also added to the mixture. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2-dimethoxyethane and ethanol. This one-pot, batch reaction produced 289 centistokes viscosity and a statisfactory foam which passed a standard rigid foam test.

EXAMPLE 11

In a manner similar to that of Example 1, to a 4-neck, round bottom flask, equipped with a stirrer, Friedrich condenser, a temperature-controller and a sparge tube the following materials were charged: 150 grams of allyloxypolyethylene glycol APEG (385 mw) of aqueous pH 5.5 adjusted with 85% phosphoric acid addition and 82.1 grams of equilibrated organohydrogenpolysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. Additionally, 0.1% of sodium bicarbonate was also added to the mixture. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2-dimethoxyethane and ethanol. This one-pot, batch reaction produced a product of 3545 centistokes in viscosity and it failed the standard rigid foam test.

EXAMPLE 12

In a manner similar to that of Example 1, to a 4-neck, round bottom flask, equipped with a stirrer, Friedrich condenser, a temperature-controller and a sparge tube the following materials were charged: 150 grams of allyloxypolyethylene glycol APEG (385 mw) of aqueous pH 5.5 adjusted with 85% phosphoric acid addition and 82.1 grams of equilibrated organohydrogenpolysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. Additionally, 0.1% of sodium carbonate was also added to the mixture. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2-dimethoxyethane and ethanol. The product became very viscous.

EXAMPLE 13

In a manner similar to that of Example 1, to a 4-neck, round bottom flask, equipped with a stirrer, Friedrich condenser, a temperature-controller and a sparge tube the following materials were charged: 150 grams of allyloxypolyethylene glycol APEG (385 mw) and 82.1 grams of equilibrated organohydrogenpolysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. Additionally, 0.1% of $NaH_2PO_4$ based on the polyether was also added to the mixture. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2-dimethoxyethane and ethanol. The reaction was very fast but the product had 5316 centistokes viscosity.

EXAMPLE 14

To a 4-neck, round bottom flask, equipped with a stirrer, Friedrich condenser, a temperature-controller and a sparge tube the following materials were charged. 150 grams of allyloxypolyethylene glycol APEG (385 mw) of aqueous pH 5.5 adjusted with 85% phosphoric acid addition and 82.1 grams of equilibrated organohydrogenpolysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. Additionally, 0.1% of sodium propionate was also added to the mixture and 30 wt% toluene was used as a solvent. The flask contents were agitated and heated to 75° C. reaction temperature with a light nitrogen sparge. At the 75° C. temperature, heating and nitrogen sparge were stopped and the reaction was catalyzed with 0.68 cc of 3.3% chloroplatinic acid solution in 1,2-dimethoxyethane and ethanol. The solvent was striped out after the reaction but no acetal treatment was done. This one-pot, batch reaction produced 259 centistokes viscosity and made an acceptable foam.

EXAMPLE 15

In the same manner as that of Example 1, to a 4neck, round bottom flask, equipped with a stirrer, Friedrich condenser, a temperature-controller and a sparge tube the following materials were charged: 160 grams of allyloxypolyethylene glycol APEG (550 mw) of aqueous pH 5.5 adjusted with 85% phosphoric acid addition and 63.6 grams of equilibrated organohydrogenpolysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. Additionally, 0.1% of sodium propionate based on APEG weight was also added to the mixture. The flask contents were agitated and heated to 75° C. reaction temperature with a light nitrogen sparge. At the 75° C. temperature, heating and nitrogen sparge were stopped and the reaction was catalyzed with 0.66 cc of 3.3% chloroplatinic acid solution in 1,2-dimethoxyethane and ethanol. This one-pot, batch reaction produced a product of 349 centistokes and made specification foam.

EXAMPLE 16

In a manner similar to that of Example 1, to a 4-neck, round bottom flask, equipped with a stirrer, Friedrich condenser, a temperature-controller and a sparge tube the following materials were charged: 172.1 grams of equilibrated organohydrogenpolysiloxane (SiH) fluid having nominal $MD_{73}D'_5M$ structure, where, $M=(CH_3)_3SiO_{\frac{1}{2}}$, $D=(CH_3)_2SiO$ and $D'=CH_3(H)SiO$ and 75.6 grams of allyloxypolyethylene glycol APEG (385 mw) of aqueous pH 5.5 adjusted with 85% phosphoric acid addition. Additionally, 0.1% of sodium propionate based on APEG weight was also added to the mixture. The flask contents were agitated and heated to 75° C. reaction temperature with a light nitrogen sparge. At the 75° C. temperature, heating and nitrogen sparge were stopped and the reaction was catalyzed with 0.51 cc of 3.3% chloroplatinic acid solution in 1,2-dimethoxyethane and ethanol. The product was typical with 882 centistokes viscosity and provided a good foam.

EXAMPLE 17

In a manner similar to that of Example 1, to a 4-neck, round bottom flask, equipped with a stirrer, Friedrich condenser, a temperature-controller and a sparge tube the following materials were charged: 69.3 grams of equilibrated organohydrogenpolysiloxane (SiH) fluid having nominal $MD_6D'_3M$ structure, where, $M=(CH_3)_3SiO_{\frac{1}{2}}$, $D=(CH_3)_2SiO$ and $D'=CH_3(H)SiO$ and 150 grams of allyloxypolyethylene glycol APEG (385 mw) of aqueous pH 5.5 adjusted with 85% phosphoric acid addition. Additionally, 0.1 wt % of sodium propionate was also added to the mixture. The flask contents were agitated and heated to 75° C. reaction temperature with a light nitrogen sparge. At the 75° C. temperature, heating and nitrogen sparge were stopped and the reaction was catalyzed with 0.45 cc of 3.3% chloroplatinic acid solution in 1,2-dimethoxyethane and ethanol. This one-pot, batch reaction produced a product of 167 centistokes viscosity and had a typical foam performance.

EXAMPLE 18

In a manner similar to that of Example 1, to a 4-neck, round bottom flask, equipped with a stirrer, Friedrich condenser, a temperature-controller and a sparge tube the following materials were charged: 150 grams of allyl-started uncapped polyether containing 75 wt % ethylene oxide and 25 wt % propylene oxide and 46.9 grams of equilibrated organohydrogenpolysiloxane (SiH) fluid having nominal $MD_{40}D'_{13}M$ structure, where, $M=(CH_3)_3SiO_{\frac{1}{2}}$, $D=(CH_3)_2SiO$ and $D'=CH_3(H)SiO$. Additionally, 0.1% of sodium propionate based on the polyether, was also added to the mixture. The flask contents were agitated and heated to 75° C. reaction temperature with a light nitrogen sparge. At the 75° C. temperature, heating and nitrogen sparge were stopped and the reaction was catalyzed with 0.88 cc of 3.3% chloroplatinic acid solution in 1,2-dimethoxyethane and ethanol. This one-pot, batch reaction produced a product of 666 centistokes viscosity and a satisfactory foam.

EXAMPLE 19

In a manner similar to that of Example 1, to a 4-neck, round bottom flask, equipped with a stirrer, Friedrich condenser, a temperature-controller and a sparge tube the following materials were charged: 150 grams of allyloxypolyethylene glycol APEG (385 mw) of aqueous pH 5.5 adjusted with 85% phosphoric acid addition and 82.1 grams of equilibrated organohydrogenpolysiloxane (SiH) fluid having nominal $MD_{15}D'_6M$ structure, where, $M=(CH_3)_3SiO_{\frac{1}{2}},D=(CH_3)_2SiO$ and $D'=CH_3(H)SiO$. Additionally, 0.1% of sodium acetate was also added to the mixture. The flask contents were agitated and heated to 75° C. reaction temperature with a light nitrogen sparge. At the 75° C. temperature, heating and nitrogen sparge were stopped and the reaction was catalyzed with 0.48 cc of 3.3% chloroplatinic acid solution in 1,2-dimethoxyethane and ethanol. This one-pot, batch reaction produced a product having 256 centistokes viscosity but failed the foam test. A repeat of this experiment gave aa acceptable foam structure.

EXAMPLE 20

In a manner similar to that of Example 1, to a 4-neck, round bottom flask, equipped with a stirrer, Friedrich condenser, a temperature-controller and a sparge tube the following materials were charged: 100 grams of $CH_2=CH-CH_2O(C_3H_6O)_6H$ and 49.1 grams of equilibrated organohydrogenpolysiloxane (SiH) fluid having nominal $MD_{15}D'_6M$ structure, where, $M=(CH_3)_3SiO_{\frac{1}{2}}$, $D=(CH_3)_2SiO$ and $D'=CH_3(H)SiO$. Additionally, 0.1% of sodium propionate base on the polyether was also added to the mixture. The flask contents were agitated and heated to 75° C. reaction temperature with a light nitrogen sparge. At the 75° C. temperature, heating and nitrogen sparge were stopped and the reaction was catalyzed with 0.31 cc of 3.3% chloroplatinic acid solution in 1,2-dimethoxyethane and ethanol. This one-pot, batch reaction produced a product of 182 centistokes viscosity and a statisfactory foam.

As indicated previously, the cured foams which had been prepared by the process of the present invention were evaluated by measuring foam height, foam weight, foam flow and foam cell quality and uniformity in a well known manner. From the results set forth in the above examples, it is evident that the surfactants made by the improved method of this invention were equal or superior to the surfactant made in solvents and without carboxylic acid salts according to one or more test criteria.

Although the invention has been illustrated by the preceding examples, it is not to be construed as being limited to the materials employed therein, but rather, the invention is directed to the generic area as hereinbefore disclosed. Various modifications and embodiments can be made without departing from the spirit and scope thereof.

What is claimed is:

1. An improved process for the preparation of siloxane-oxyalkylene copolymers in an essentially solventless system, said process comprising the steps of:
   (1) forming a mixture of:
      (a) an organohydrogensiloxane having the average formula:

$$R_aH_bSiO_{(4-a-b)/2}$$

wherein R represents a monovalent hydrocarbon radical, a has a value of from 1 to 2.99, b has a value of from 0.001 to 1, and the sum of a+b has a value of from 1.5 to 3.0;
      (b) a polyoxyalkylene having the average formula:

$$R^1(OCH_2CH_2)_z(OCH_2\overset{\underset{\displaystyle CH_3}{|}}{CH})_w-OR^2$$

wherein the ethylene oxide and propylene oxide may be blocked or random and wherein $R^1$ is an alkenyl group; $R^2$ is hydrogen or in less than 75 percent of the polyoxyalkylene molecules present, $R^2$ can represent alkyl, acyl, alkaryl and trialkylsilyl groups; z has a value of from 0 to 50 and w has a value of 0 to 50;
      (c) a carboxylic acid or a carboxylic acid salt as a reaction promoter,
   (2) adjusting and maintaining the temperature of said mixture to a temperature to promote the reaction of said organohydrogensiloxane with said polyoxyalkylene;
   (3) adding to said mixture a catalytic amount of a noble metal hydrosilation catalyst,
   (4) allowing said reaction to go to completion, and
   (5) recovering said copolymer.

2. The process of claim 1 wherein the temperature in step (2) is from about 0° to about 180° C.

3. The process of claim 1 wherein the temperature in step (2) is from about 20° to about 120° C.

4. The process of claim 1 wherein the organohydrogensiloxane is selected from the group consisting of: $R_3SiO_{\frac{1}{2}}$, $R_2HSiO_{\frac{1}{2}}$, $R_2SiO_{2/2}$, $RHSiO_{2/2}$, $RSiO_{3/2}$, $HSiO_{3/2}$ and $SiO_{4/2}$ wherein $R-R_3$ represent a monovalent hydrocarbon radical.

5. The process of claim 1 wherein the polyoxyalkylene has the average formula:

$$CH_2=CHCH_2O(CH_2CH_2O)_{0-50}(CH_2CHCH_3O)_{0-50}H$$

and the organohydrogenpolysiloxane has the average formula $$Me_3SiO(Me_2SiO)_{0-200}(MeHSiO)_{1-25}SiMe_3$$

6. The process of claim 1 wherein said carboxylic acid reaction promoter has the formula:

$$RCO_2M$$

wherein M is selected from the group consisting of H, alkali metal, alkaline earth metal, ammonium ion and tetraalkylphosphonium ion, and R represents a monovalent hydrocarbon.

7. The process of claim 6 wherein said carboxylic acid reaction promoter contains at least 3 carbon atoms and is composed of carbon, hydrogen, oxygen and M.

8. The process of claim 1 wherein said carboxylic acid reaction promoter has the formula:

$$RCO_2M$$

wherein M represents an ammonium or tetraalkylphosphonium ion and R represents monovalent hydrocarbon.

9. The process of claim 1 wherein said carboxylic acid reaction promoter has the formula:

$$RCO_2M$$

wherein M represents an alkali metal or an alkaline earth metal and R represents monovalent hydrocarbon.

10. The process of claim 9 wherein said carboxylic acid reaction promoter is sodium butyrate.

11. The process of claim 9 wherein said carboxylic acid reaction promoter is sodium propionate.

12. The process of claim 1 wherein said noble metal hydrosilation catalyst is platinum.

13. The process of claim 1 wherein said hydrosilation catalyst is $H_2PtCl_6 \cdot H_2O$.

* * * * *